(12) United States Patent
Ahirwar et al.

(10) Patent No.: US 8,050,350 B2
(45) Date of Patent: Nov. 1, 2011

(54) RECEIVER I-Q BALANCE CALIBRATION

(75) Inventors: Vijay Ahirwar, Bhopal (IN); Mohit Agarwal, Gurgaon (IN)

(73) Assignee: NXP. B.V., Eindhoven (NL)

(*) Notice: Subject to any disclaimer, the term of this patent is extended or adjusted under 35 U.S.C. 154(b) by 493 days.

(21) Appl. No.: 12/346,075

(22) Filed: Dec. 30, 2008

(65) Prior Publication Data

US 2010/0166049 A1   Jul. 1, 2010

(51) Int. Cl.
  *H04L 27/10* (2006.01)
(52) U.S. Cl. ........................................... 375/281
(58) Field of Classification Search ............... 375/279, 375/280, 281, 283, 308, 322, 323, 329, 330, 375/331, 332, 143, 152, 343; 370/215, 290, 370/291; 455/23, 42, 205; 379/390.02; 708/314
  See application file for complete search history.

(56) References Cited

U.S. PATENT DOCUMENTS 6,895,045 B2 * 5/2005 Ozluturk et al. ............. 375/235
2007/0189371 A1 * 8/2007 Yen .............................. 375/219

OTHER PUBLICATIONS

Xing et al., "Frequency Offset and I/Q Imbalance Compensation for Direct-Conversion Receivers", IEEE Tranactions on Wireless Comm., vol. 4, No. 2, Mar. 2005.

* cited by examiner

*Primary Examiner* — Sam K Ahn (57) ABSTRACT

In an I-Q receiver, I-Q baseband mixer receives a real signal, and outputs an in-phase baseband information signal and a quadrature baseband information signal, a decoupling compensator multiplies in-phase baseband information signal and the quadrature baseband information signal by a trained decoupling matrix that, based on adaptive training in response to purely in-phase and purely quadrature phase training signals, decouples the in-phase baseband information signal from a quadrature component of the I-Q signal, and decouples quadrature-phase baseband information signal from an in-phase component of the I-Q signal. Optionally, a trained I-arm-Q-arm imbalance compensator performs a filter compensation on one or both of the decoupled in-phase baseband signal and the quadrature-phase baseband signal output by the trained decoupling matrix. Optionally, the filter is trained based on training signals generated by inputting equal in-phase and quadrature phase training signals to the I-Q baseband mixer, and multiplying the result by the trained decoupling matrix.

11 Claims, 7 Drawing Sheets

RECEIVER I-Q BALANCE CALIBRATION

TECHNICAL FIELD

Embodiments relate generally to I-Q receivers, and particularly compensation of imbalances between I and Q paths.

BACKGROUND

Communication of information using carrier signals having an in-phase component signal and an out-of-phase component signal is well known.

The in-phase component of the two-dimensional carrier signal may be a sinusoid, e.g., $\cos(\omega t)$, and the out-of-phase component may be a 90 degree phase-shift of the in-phase component, e.g., $\sin(\omega t)$. Referenced to a complex plane having a "real" and an imaginary or "j" axis, the carrier signal may be represented as $\cos(\omega t) - j \sin(\omega t)$, and the in-phase component signal, $\cos(\omega t)$, may be referenced as the "I" signal, and the out-of-phase component signal may be referenced as the "quadrature" or "Q" signal. Such communication may therefore be referred as "two-dimensional" signaling.

Quadrature-amplitude modulation (QAM) is one example of a two-dimensional signaling. In QAM, symbols, e.g., binary bits or groups of binary bits, are encoded as amplitude-phase states of a transmission signal, each of the states being from a constellation of amplitude-phase states defined on the complex plane by the particular QAM coding scheme. As known, there may be N different ones of the states within the constellation, or different changes of states, representing different symbols.

Illustrative examples of QAM include, but are not limited to, binary phase shift keying (BPSK), which has a two-state constellation, quadrature phase shift keying (QPSK), having a four-state constellation and, more generally, M-ary phase-shift keying, having an M-state constellation.

A typical QAM receiver extracts the symbol sequence from the QAM transmission using a local baseband oscillator, having (within an acceptable accuracy and stability) the same frequency as the oscillator used by the transmitter, and a phase-shift arrangement to generate a local in-phase and quadrature-phase baseband mixing signal.

However, as also known, because QAM encodes information using relative amplitude and phase between I and Q signals, QAM systems are necessarily sensitive to the inaccuracies, e.g., imbalances, occurring within I and Q generation, mixers and propagation paths.

SUMMARY

The present invention provides, among other features, benefits and applications, effective, adaptive decoupling of I-signal components and Q-signal components that would otherwise manifest from various imperfections of the I-Q baseband mixer.

It will be understood that an effective operation of an actual, real-world I-Q baseband mixer, combined with the described trainable mixer imbalance compensation unit, or any of the various alternatives apparent to persons skilled in the art based on this disclosure, provides a functional equivalent of an ideal mixer. This is one among the various benefits provided by various example embodiments within the present invention.

One or more embodiments may include, for example, only the trainable mixer imbalance compensation unit, arranged in any manner described by, or apparent from the present disclosure, to perform the disclosed functions of decoupling the mutual effects, i.e., mutual distorting effects, of I-signal components and Q-signal components arising from real-world I-Q baseband mixers.

According to one example, a method of compensating an I-Q receiver imbalance wherein a real-world receiver mixer introduces an unbalanced cross-coupling effect (i.e. not a complex multiplication) includes inputting a given I-Q signal to a baseband I-Q mixer, to generate an in-phase baseband signal and a quadrature-phase baseband signal; propagating the in-phase baseband signal and the quadrature-phase baseband signal through an I-path and Q-path, respectively, to generate an I-path propagated in-phase baseband signal and a Q-path propagated quadrature-phase baseband signal; generating a mixer decoupled in-phase baseband signal based on the I-path propagated in-phase baseband signal and the Q-path propagated quadrature-phase baseband signal, wherein the generating includes forming a first arithmetic product of the I-path propagated in-phase baseband signal and a given first scalar, and forming a second arithmetic product of the Q-path propagated in-phase baseband signal and given first decoupling value, and is based on a sum of the first product and the second product; and generating a mixer decoupled quadrature-phase baseband signal based on the I-path propagated in-phase baseband signal and the Q-path propagated quadrature-phase baseband signal, wherein the generating includes forming a third arithmetic product of the I-path propagated in-phase baseband signal and a given second scalar, and forming a fourth arithmetic product of the Q-path propagated in-phase baseband signal and given second decoupling value, and is based on a sum of the third product and the fourth product.

According to one aspect, the first scalar may be a nominal unity value and, according to another aspect, the first decoupling value may be a first finite impulse response (FIR) filter operation, S. In one example according to one aspect having the first scalar as a nominal unity value and the first decoupling value as the FIR operation S, generating the mixer-decoupled in-phase baseband signal comprises filtering the Q-path propagated quadrature-phase signal by the FIR operation S and adding the FIR result to the I-path propagated in-phase baseband signal.

According to one aspect, the second scalar may be a nominal unity value and, according to another aspect, the second decoupling value may be a second finite impulse response (FIR) filter operation, P. In one example according to one aspect having the second scalar as a nominal unity value and the second decoupling value as the FIR operation P, generating the mixer-decoupled quadrature-phase baseband signal comprises filtering the I-path propagated quadrature-phase signal by the FIR operation P and adding the FIR result to the Q-path propagated quadrature-phase baseband signal.

According to one aspect, in one example the method of compensating an I-Q receiver imbalance includes a training of the first decoupling value, wherein the first decoupling value may be an FIR filter operation S, wherein the training includes inputting an input I-Q signal consisting of a non-zero in-phase signal component and a substantially zero quadrature component and iteratively adapting the first decoupling value, which may comprise iteratively adapting an FIR operation S, to where the sum of the second product and the third product is below a given first coupling threshold.

According to one aspect, the given first coupling threshold is approximately zero.

According to one aspect, in one example the method of compensating an I-Q receiver imbalance includes a training of the second decoupling value, wherein the training includes inputting an input I-Q signal consisting of a zero in-phase signal component and a non-zero quadrature component and iteratively adapting the second decoupling value to where the sum of the third product and the fourth product is below a given second coupling threshold.

According to one aspect, the given second coupling threshold may be the same as the given first coupling threshold, and may be approximately zero.

According to one aspect, in one example of the method of compensating an I-Q receiver imbalance wherein the in-phase and quadrature-phase components are not equal when the transmitted signal on the I-path and the Q-path is the same includes inputting a given I-Q signal to a baseband I-Q mixer, to generate an in-phase baseband signal and a quadrature-phase baseband signal; propagating the in-phase baseband signal and the quadrature-phase baseband signal through an I-path and Q-path, respectively, to generate an I-path propagated in-phase baseband signal and a Q-path propagated quadrature-phase baseband signal; generating a balanced I-Q signal wherein the generating includes forming a first arithmetic product of the I-path propagated in-phase baseband signal and a first balancing factor and a second arithmetic product of the Q-path propagated quadrature-phase baseband signal and a second balancing factor; and the balanced I-path in-phase baseband signal is given by the first arithmetic product and the balanced Q-path quadrature baseband signal is given by the second arithmetic product.

According to one aspect, the first balancing factor may be a first finite impulse response (FIR) filter operation, S. In one example according to this one aspect generating the mixer-decoupled in-phase baseband signal comprises filtering the Q-path propagated quadrature-phase signal by the FIR operation S and adding the FIR result to the I-path propagated in-phase baseband signal.

According to one aspect, the second balancing may be a second finite impulse response (FIR) filter operation, P. In one example according to this one aspect, generating the mixer-decoupled quadrature-phase baseband signal comprises filtering the I-path propagated quadrature-phase signal by the FIR operation P and adding the FIR result to the Q-path propagated quadrature-phase baseband signal.

According to one aspect, in one example the method of compensating an I-Q receiver imbalance includes a training of the first balancing factor, wherein the training includes inputting an input I-Q signal consisting of a non-zero in-phase signal component and a non-zero quadrature component wherein the in-phase and quadrature-phase components are equal, and iteratively adapting the first balancing factor to where the difference of the balanced I-path in-phase baseband signal and the Q-path quadrature-phase baseband signal is below a given first balancing threshold.

According to one aspect, the given first balancing threshold is approximately zero.

According to one aspect, in one example the method of compensating an I-Q receiver imbalance includes a training of the second balancing factor, wherein the training includes inputting an input I-Q signal consisting of a non-zero in-phase signal component and a non-zero quadrature component wherein the in-phase and quadrature-phase components are equal, and iteratively adapting the second balancing factor to where the difference of the balanced I-path in-phase baseband signal and the Q-path quadrature-phase baseband signal is below a given balancing threshold.

According to one aspect, the given second coupling threshold may be the same as the given first coupling threshold, and may be approximately zero.

According to one example, a method of compensating an I-Q receiver imbalance wherein a real-world receiver mixer introduces an unbalanced cross-coupling effect (i.e. not a complex multiplication), and other sources as known to persons trained in this art introduce an independent I-path and Q-path imbalance, by utilizing the inventive methods described herein in a cascade or other combination that may be apparent to persons of ordinary skill in this art upon reading this disclosure and practicing this invention.

These and other advances and advantages of the various exemplary embodiments will be apparent from the description herein or can be learned from practicing systems and method including one or more of the various exemplary embodiments, both as illustrated herein and as modified in view of any variation which may be apparent to those skilled in the art.

Further, the above-summarized advances advantages of the invention are illustrative of those that can be achieved by the various exemplary embodiments, and are not intended to be exhaustive or limiting of the possible advantages which can be realized.

DETAILED DESCRIPTION

Certain embodiments, features, aspects, and illustrative examples for practicing the invention are described. The description is of the invention. To avoid obscuring novel features and aspects, and to readily provide persons skilled in the relevant arts a complete understanding of the invention, the description may omit various details of methods and techniques known to such persons which, upon reading this description, will be readily identifiable by such persons as applicable in practicing the claimed invention.

It will be understood that the particular examples are only for facilitating understanding of the invention by way of illustrative example and, further, that the invention is not limited to the specific examples described and depicted by the attached drawings. Other configurations and arrangements can, upon reading this description, be readily recognized and implemented by persons skilled in the relevant arts.

Various embodiments and aspects may be described separately or as having certain differences. Separate description, however, does not necessarily mean the embodiments or aspects are mutually exclusive. For example, a particular feature, function, or characteristic described in relation to one embodiment may be included in other embodiments.

The description refers to accompanying drawings, which form a part of this description. It will be understood that for ease of reference and consistency like numerals appearing in different drawings, whether of the same or different embodiments, reference functional blocks or items that are, or may be, identical or substantially identical between the different drawings.

Figure 1:
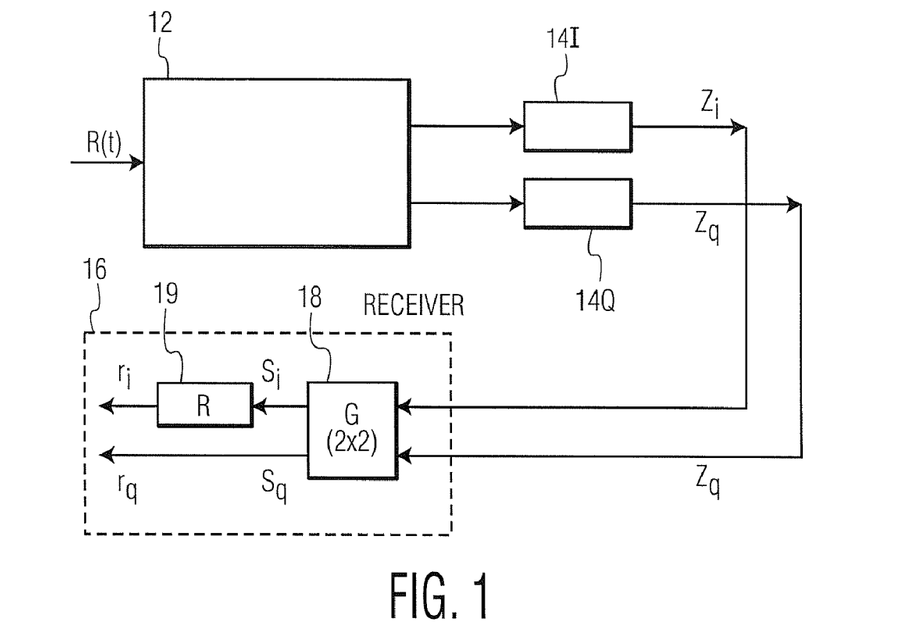
FIG. 1 is a functional block diagram of one example compensated I-Q receiver having one example mixer I-Q imbalance section, for I-Q imbalance compensation according to various embodiments.

FIG. 1 is a functional block diagram of one illustrative example imbalance compensated I-Q receiver 10, according to one example embodiment. The example 10 comprises a baseband I-Q mixer 12 arranged to receive a baseband I-Q input signal, Rin(t). It will be understood that the term "baseband," as used in conjunction with the input signal Rin(t) does not mean centered at a zero frequency; it means that in the frequency domain Rin(t) is centered at a $\omega_c$ carrier frequency, which is described in greater detail in sections below. The signal Rin(t) may be received from, for example, a conventional QAM front-end.

With continuing reference to FIG. 1, the specific kind of I-Q signal modulation, e.g., QAM modulation, embodied by Rin(t), during operation of the example 10 is not relevant to understanding the structures, concepts or methods performed by the FIG. 1 example. However, illustrative example forms of Rin(t), in relation, for example, to aspects of training various exemplary embodiments of imbalance compensation, according to embodiments shown at FIG. 1, and other examples, are described in greater detail in later sections.

Referring again to FIG. 1, for purposes of describing functional blocks by example operations, the baseband signal $R_{in}(t)$ may be mathematically represented as $$R(t) = \Re[x_I(t) + jx_Q(t)] \cdot e^{j\omega_c t} + n(t) \qquad \text{Equation (1)}$$

where $x_I(t)$ and $x_Q(t)$ are the in-phase and quadrature component, respectively, of the information signal, $\omega_c$ is the carrier frequency identified above, and n(t) is a noise signal.

With respect noise n(t), this may include noise in the channel (not shown in FIG. 1) between the transmitter (not shown in FIG. 1) and an input (not shown) of, for example, a conventional I-Q receiver front end (not shown), and the noise of such a conventional I-Q receiver front end. These causes are not particular to the present embodiments. Therefore, for purposes of facilitating a clear explanation of concepts and features, to enable persons of ordinary skill in the art to practice the invention, example operations are described assuming that channel noise is absent and receiver noise is absent from Rin(t). A person of ordinary skill in the art, however, based on the present disclosure, may readily model such noise sources and may readily modify all example models described herein to accurately represent such noise.

For illustrative example, in reference to FIG. 1, Rin(t) may be digital data (e.g., a binary data having S bits), and all functional blocks may be implemented as digital arithmetic and storage circuitry. Alternatively, Rin(t) may be a continuous time analog signal and all of, or some of, the functional blocks may be implemented as analog processor components. Further to this alternative, Rin(t) and/or various of the functional blocks and intermediate signals described in reference to "t," may be implemented as discrete-time (sample-and-hold) types of analog signals. As another alternative, an I-Q receiver implementing the functional flow, or equivalent, of the FIG. 1 example 10 may be implemented, for example, as a hybrid of analog and digital components.

It will therefore be understood that, unless otherwise stated or made clear from the context to have a different meaning, the time variable "t" may be substituted for and encompasses nT, where "n" is an integer index and "T" is a given sampling interval. Likewise, unless otherwise stated or made clear from the context to have a different meaning, all descriptions of example addition, subtraction, multiplication and division that refer to a digital operation may, in an analog implementation, be realized as an analog operation.

Referring to FIG. 1, the baseband I-Q mixer 12 may be implemented as, for example, with a conventional I-Q receiver baseband mixer The baseband I-Q mixer 12 may have a conventional local oscillator (not shown in the figures), having a frequency $\omega'_C$ to perform a down-conversion to translate, i.e., shift, the Rin(t) signal to a zero frequency baseband, and to generate, at its 12I output, a baseband in-phase information signal, $v_I(t)$ and to generate at its 12Q output a quadrature-phase information sign $v_Q(t)$.

It will understood that, unless otherwise stated or made clear from its context to have a different meaning, all descriptions of example operations herein assume, for purposes of focusing the description to fully enable persons skilled in the art to form a clear understanding of all concepts needed to practice systems and methods having one or more of the embodiments, that Rin(t) has been corrected for its I-Q mixer imbalances.

Further, it will be understood that unless otherwise stated or made clear from its context to have a different meaning, all descriptions of example operations herein assume the frequency $\omega'_C$ is sufficiently close to $\omega_C$ that no substantial offset of the baseband manifests. Illustrative examples according to various embodiments in an I-Q transceiver arrangement are described in greater detail in later sections, and operations are described that use I-Q signals generated by the transmitter section of the I-Q transceiver, looped back through a loopback switch to an input of the I-Q receiver, for training imbalance compensation filters as will be described. It will be understood by persons of ordinary skill in the art that the training operations, as described, require $\omega'_C$ be identical to $\omega_C$, or within a negligible deviation. It will be apparent to persons of ordinary skill in the art that the loopback may be implemented to provide for this by, for example, using the same oscillator for the transmitter mixers as the receiver mixers.

Further regarding $\omega'_C$ and $\omega_C$ as will be understood by persons of ordinary skill in the art, among the various features and benefits of the present embodiments is that the arbitrary phase rotations that may occur in the loopback signal (i.e., a multiplication by exp(jh)) where h is a constant, even though $\omega'_C$ is identical to $\omega_C$) due to, for example, path delays, the embodiments' adaptive training processes are agnostic to such phase rotations. As will be understood, and will be apparent, the embodiments' adaptive training processes will still, even with such arbitrary phase rotations, provide adaptation of the decoupling and balancing factors (e.g., FIR filters) to compensate for the receiver IQ imbalance Further regarding ranges of permissible deviation between $\omega'_C$ and $\omega_C$, it will be apparent to persons or ordinary skill in the art from this disclosure that systems and methods for compensating imbalances in I-Q receiver according to the disclosed embodiments are not limited to transceiver arrangements, and may be practiced in I-Q receivers without a local I-Q transmitter. However, it will also be apparent to persons of ordinary skill in the art, based on the present disclosure, that such may readily ascertain, by applying the know-how such persons possess to this disclosure, the required accuracy of $\omega'_C$ necessary to practice methods and systems according to the disclosed embodiments.

Referring to FIG. 1, if the baseband mixer 12 were perfect in all respects the only coupling that would occur between the in-phase component of Rin(t), namely, $x_I(t)$ and the quadrature-phase baseband information signal $v_Q(t)$ would be that resulting from an arbitrary phase rotation, if any existed, between $\omega'_C$ and $\omega_C$, i.e., the result of a complex multiplication (of exp(jh)), but this "coupling" would not contain any IQ imbalance. Indeed, such "coupling" from arbitrary phase rotation between $\omega'_C$ and $\omega_C$, is readily compensated using known methods.

However, because of various imperfections in the baseband mixer 12, imbalance induced coupling does exists between the in-phase component, $x_I(t)$ and the quadrature-phase component $v_Q(t)$, which is different from the readily compensated complex multiplication caused by simple phase rotation between $\omega'_C$ and $\omega_C$. If not compensated, these imperfections may cause negative effects such as, for example, symbol error due to distortion in the constellation position represented by $[v_I(t), v_Q(t)]$.

The FIG. 1 example I-Q receiver 10 includes various aspects and features that, as will described in greater detail in later sections, effectively compensate various imperfections in real-world I-Q mixers, including imperfections that manifest as unbalanced couplings identified above, and other imperfections having other effects, as described.

One aspect of various exemplary embodiments, combining with other features to provide, among other benefits, effective and efficient compensation of various imperfections in real-world I-Q mixers, and related circuitry, is the novel modeling of, and novel methods of characterizing, certain kinds of such imperfections.

As will be understood, the described modeling and methods of characterizing provide further methods of efficient, effective compensation processing and, further, provide efficient, accurate methods for automatic adapting of the compensation methods, and apparatuses, to dynamically match different structural peculiarities.

As will be also be understood, in addition to providing further methods of efficient, effective compensation processing and, further, providing efficient, accurate methods for automatic adapting of the described compensation methods, and apparatuses, to dynamically match different structural peculiarities, various aspects further provide for robust adaptation to changing parameters, such as non-stationary I-Q baseband mixer and I-Q arm parameters.

Figure 2:
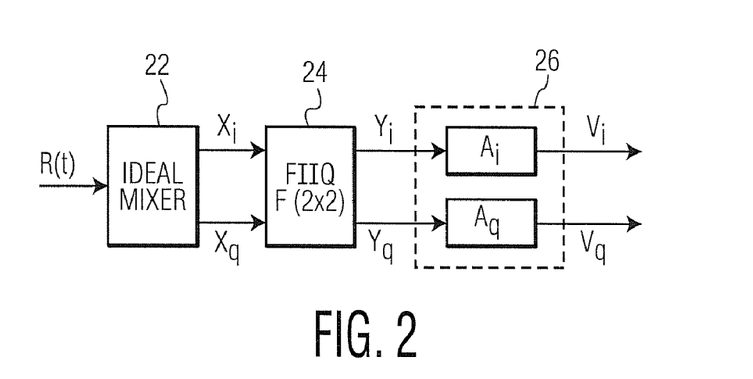
FIG. 2 depicts one example model, according to various embodiments, of I-Q mixer imbalance to generate compensation values of an I-Q mixer imbalance decoupling compensator according to various embodiments.

FIG. 2 depicts one example model 20, according to various embodiments, of certain imbalances within an I-Q baseband mixer such as the illustrative exemplar 12. As will be described in greater detail in later sections, the FIG. 2 example model 20 is employed, according to various exemplary embodiments, to generate compensation values of one or more example I-Q mixer imbalance decoupling compensator such as, for example, the I-Q mixer imbalance decoupling compensator 18.

Referring to the FIG. 2 example model 20 forms a representation of the FIG. 1 I-Q baseband mixer 12 as a cascade of an ideal mixer, 22, followed by an I-Q imbalance that, itself, is formed as cascade of an F matrix 24 and an A matrix 26.

With continuing reference to FIG. 2, the output of the ideal mixer 22 may be written as X=transpose[$x_i$ $x_q$], where $x_i = x_I(t)$, and $x_q = x_Q(t)$, with Y=FX, the F matrix 24 is formed as a 2×2 matrix, with scalar elements, and Y=Y=$y_i$+$jy_q$, where $y_i = y_I(t)$ and $y_q = y_Q(t)$, such that $$\begin{bmatrix} y_i \\ y_q \end{bmatrix} = \begin{bmatrix} f_{11} & f_{12} \\ f_{21} & f_{22} \end{bmatrix} \cdot \begin{bmatrix} x_i \\ x_q \end{bmatrix} \qquad \text{Equation (2)}$$

As can be seen, for any non-zero $f_{12}$ and/or $f_{21}$ the result is cross coupling between the quadrature-phase component of R in(t), $x_q$, and the in-phase component of Y, $y_i$, and/or between the in-phase component of Rin(t), $x_i$, and the quadrature-phase component of Y, $y_q$; furthermore if $f_{12}$ is not equal to negative of $f_{21}$ then there exists an unbalanced cross coupling which will result in IQ imbalance.

Because of imperfections in almost any actual construction of any baseband mixer having the functions represented by the FIG. 1 I-Q baseband mixer 12, typically both $f_{12}$ and $f_{21}$ are non-zero and $f_{12}$ is not equal to negative of $f_{21}$. As described in greater detail in later sections, training of the operations represented by, as one example, the G matrix multiplier function of the I-Q mixer imbalance decoupling unit 18 compensates for $f_{12}$ and $f_{21}$ being non-zero and/or $f_{12}$ is not equal to negative of $f_{21}$.

Referring again to FIG. 2, the example 20 further employs in its model of a real-world I-Q baseband mixer, such as the mixer 12 of the FIG. 1 example receiver 10, a matrix A, shown as block, 26, comprising different low pass filters (LPFs), arbitrarily labeled $A_i$ and $A_q$, to represent imbalances with respect to delays between the I-path 14I and the Q-path 14Q.

Therefore, as can be seen, the modeled transfer function of the I-Q baseband mixer 12, as provided by the above-described aspects, may be represented as, for example, V=AY, with Y defined above as FX, and A being the above-defined 2×2 matrix, preferably having vector elements along the major diagonal, and zero-valued elements off the major diagonal, such that:

$$\begin{bmatrix} v_i \\ v_q \end{bmatrix} = \begin{bmatrix} A_i & 0 \\ 0 & A_q \end{bmatrix} \begin{bmatrix} y_i \\ y_q \end{bmatrix} \qquad \text{Equation (3)}$$

Preferably, as can be seen by persons skilled in the art in view of Equations (4)-(6), described in greater detail in later sections, and other sections of this disclosure, the model 20 forms $A_i$ and $A_q$ to be real (not complex) LPFs.

Referring to FIG. 2, if the I=Q baseband mixer 12 were perfect, the FIG. 2 model 20 filters $A_i$ and $A_q$ would be equal over the frequency band of interest. Imperfections, however, manifest as unequal values $A_i$ and $A_q$, represent a different delay for the I and the Q signal. These differences cause a frequency dependent I-Q imbalance (FDIQ). Since all terms of A off of the major diagonal are zero, FDIQ does not result in cross-coupling between the in-phase and quadrature components of R(-in(t) and the in-phase and quadrature baseband information signals.

As will be described in greater detail in later sections, compensators of the various exemplary embodiments such as, for example, the FDIQ imbalance compensator 19 of the FIG. 1 example, are readily trained to compensate FDIQ arising from $A_i$ and $A_q$ being unequal, as well as similar kinds of delay differences between the I-arm 14I and the Q-arm 14Q.

Referring again to FIG. 1, the structure labeled 14I, referenced hereinafter as the "I-arm" 14I, comprises the various structures (filters, transmission lines and the like) forming the propagation path for the in-phase baseband signal $V_i$ from the mixer output 12I to, for example, a symbol decoder (not shown in FIG. 1). Likewise, the structure labeled 14Q, hereinafter referenced as the "Q-arm" 14Q, comprises the propagation path for the quadrature-phase baseband signal $V_q$ from the mixer output 12Q to, for example, the above-identified symbol decoder. The Q-arm 14Q may be structured substantially identically to the I-arm 14I.

Figure 3:
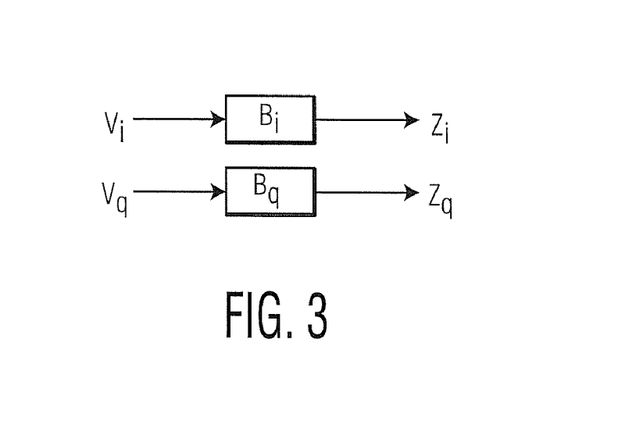
FIG. 3 depicts one example model, within various embodiments, of I-arm and Q-arm imbalance for generating compensation values of an I-Q arm imbalance compensator according to various embodiments.

FIG. 3 depicts one example model 30, employed in association with various exemplary embodiments, of an imbalance in the I-arm 14I and Q-arm 14Q delay, causing FDIQ.

Referring to FIG. 3, the model 30 represents mismatch in the delay between an I-arm such as 14I and a Q-arm such as 14Q as mismatched real filters $B_i$ and $B_q$. In other words, FIG. 3 models a mismatch between 14I and 14Q as $B_i \neq B_q$. This mismatch in the delay between the I-arm and the Q-arm, e.g., between 14I and 14Q, is modeled similar to the above-described FDIQ arising from delay imbalance in the I-Q baseband mixer 12, which is modeled in the FIG. 2 example 20 as $A_i \neq A_q$.

Since $B_i$ and $B_q$ do not effect a cross-coupling, these their operation on V (representing the signals $V_i$ and $V_q$ from the mixer 12) may be represented as:

$$B = \begin{bmatrix} B_i & 0 \\ 0 & B_q \end{bmatrix}$$

Equation (4)

Referring again to FIG. 1, the example I-Q receiver 10 includes an I-Q imbalance compensator 16 that may include an FDIQ compensator 19. The FIG. 1 example FDIQ compensator 19, if included, performs arithmetic, or equivalent, signal processing operations, described in greater detail in later sections, adapted to compensate for actual imbalances of the I-Q mixer 12 arms 14I and 14Q, (modeled at FIG. 3 as $B_i \neq B_q$), as well as FDIQ within the mixer 12, (modeled at FIG. 2 as $A_i \neq A_q$). The arithmetic or equivalent signal processing operations of the example FDIQ compensator 19 may be configured based on a training, which is described in greater detail in later sections.

Figure 4:
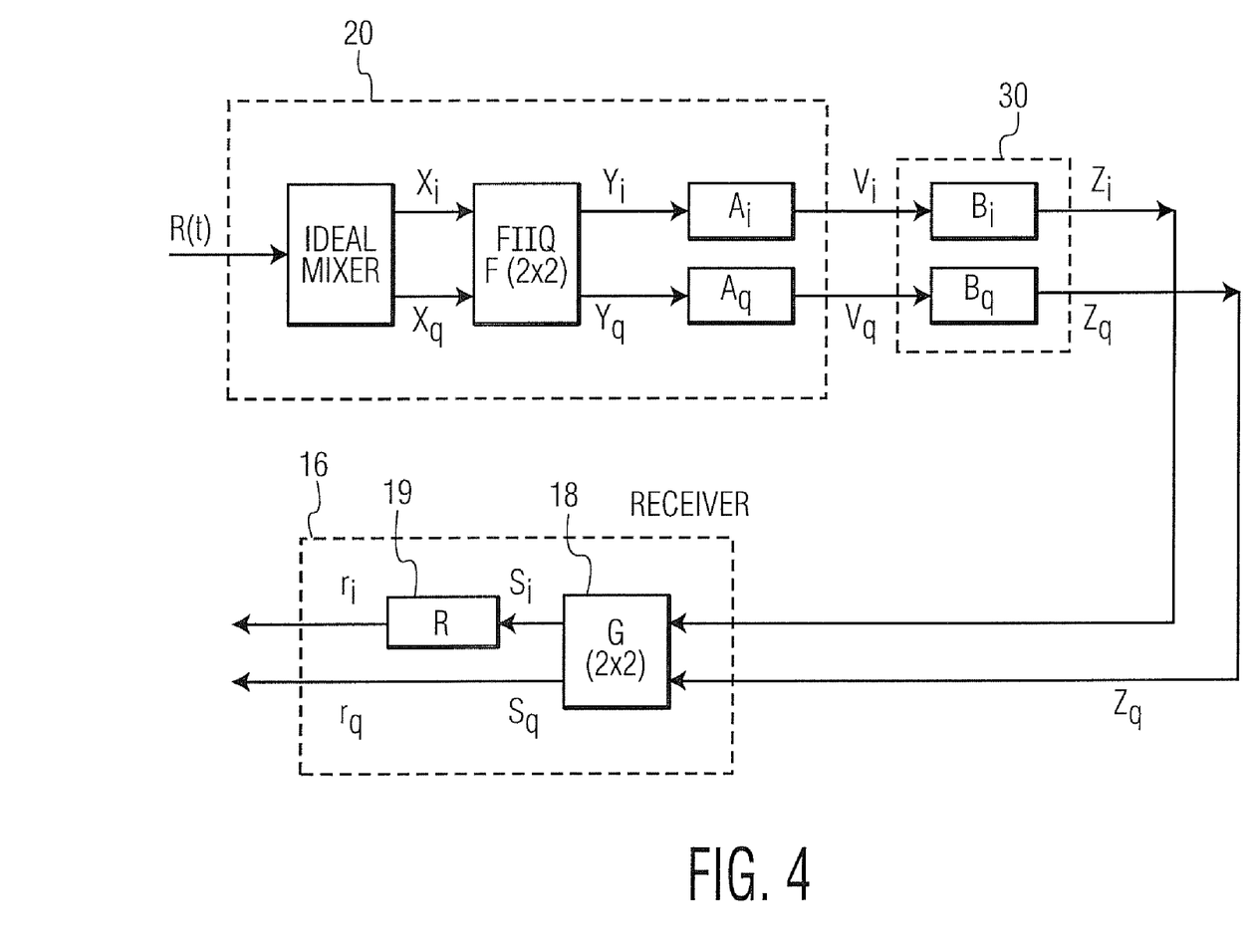
FIG. 4 depicts the example FIG. 1 functional block diagram of one example compensated I-Q receiver showing, as one example representation of one example implemented I-Q mixer, the FIG. 2 example model of the I-Q mixer and its I-Q imbalance and, as one example representation of one example implemented I-arm and Q-arm, the FIG. 3 example model of the I-arm and Q-arm, with respective imbalance.

FIG. 4 depicts the example FIG. 1 functional block diagram of one example compensated I-Q receiver 10, showing the FIG. 2 example model 20 in place of the I=Q baseband mixer 12, showing the ideal mixer 22, F matrix 24 and A matrix 26, and the FIG. 3 model 30 in place of the I-arm 14I and Q-arm 14Q.

Example I-Q Mixer Imbalance Decoupling Compensator

Referring to FIG. 4, according to one aspect, the I-Q mixer imbalance decoupling compensator 18 is matrix G, that may have a form of, for example:

$$G = \begin{bmatrix} 1 & P \\ S & 1 \end{bmatrix},$$

Equation (5)

where P and S may be real scalars but, according to one aspect, are FIR filters, which may be represented as vectors, such that s=transpose[$s_i$ $s_q$]=G*z=GBAFx=Dx, and where B, A, F and x are defined above, the matrix D may be represented as $$D = \begin{bmatrix} 1 & P \\ S & 1 \end{bmatrix} * \begin{bmatrix} B_i & 0 \\ 0 & B_q \end{bmatrix} * \begin{bmatrix} A_i & 0 \\ 0 & A_q \end{bmatrix} * \begin{bmatrix} f_{11} & f_{12} \\ f_{21} & f_{22} \end{bmatrix}$$

$$= \begin{bmatrix} M & 0 \\ 0 & N \end{bmatrix}$$

Equation (6)

or $$D = G * \begin{bmatrix} B_i & 0 \\ 0 & B_q \end{bmatrix} * \begin{bmatrix} A_i & 0 \\ 0 & A_q \end{bmatrix} * \begin{bmatrix} f_{11} & f_{12} \\ f_{21} & f_{22} \end{bmatrix}$$

$$= \begin{bmatrix} M & 0 \\ 0 & N \end{bmatrix}$$

It will be understood that S and P, if implemented as filters, are not limited to FIR filters, and may be implemented as infinite impulse response (IIR) filters. Likewise, it will be understood that compensation operations as represented by G may be implemented as analog operations and, if implemented as such, that P and S may be analog filter functions. Persons of ordinary skill in the art, by applying the know-how such persons possess to this disclosure, can select appropriate analog filter types, and implement such analog filter to have variable, controllable parameters providing for training such filters using, for example, a feedback-based training system corresponding to the discrete time training system example described, in reference to FIG. 6, in greater detail in later sections.

As can be seen, aspects represented by the Equation (6) form provide ready methods to estimate P and S. The aspects provide this and other benefits by, for example, providing ready separation of estimation of the decoupling unit 18 values P and S, to decoupling imperfections of the I-Q baseband mixer (e.g., the mixer 12m represented by, for example, as $f_{12}$ and/or $f_{21}$ of F being non-zero and/or $f_{12}$ is not equal to negative of $f_{21}$), from estimation of the R filter of the FDIQ compensator 19 which, as described in greater detail in later sections, cancels the delay imbalances and frequency dependent IQ imbalances represented by, for example matrices A and B.

It will be understood, though, that the particular depicted form of the Equation (6) mathematical model is only one illustration of one example representation. Alternative mathematical forms, and alternative models for representing the imperfection characteristics represented by the F matrix, as well as the A and B matrices, including other forms providing separable estimation of a small number of unknowns, e.g., P and S (and R) by for example, an iterative least-mean-square (LMS) adaptive estimation, such as described below, may be identified by persons skilled in the art upon reading this disclosure.

As will be described in greater detail in subsequent sections, P and S may be estimated, or trained using, for example, particular described example training signals and, for example, an iterative estimation, to perform a 2×2 multiplication that zeroes (or effectively zeroes) all elements of D that are off the major diagonal. As can be understood from this disclosure, this training of D effectively decouples the I and Q effects of various imperfections occurring in various real-world mixer components and circuitry.

According to one aspect, P and S may be trained by initializing a representation of the G matrix to a given initial value, and inputting a first training signal $\overline{Rin}(t)$ consisting, according to one aspect, of a purely I-component. This aspect utilizes that, if the baseband I-Q mixer 12 of the receiver 10 were perfect, it would have no imbalance which, referring to the FIG. 2 model 20, means $f_{12}=f_{21}=0$. In such a case, since the first training signal is a purely I-component signal, the mixer imbalance decoupled Q signal $S_q$ output from the unit 18 would, necessarily, be zero. This aspect employs this by assigning the mixer imbalance compensated Q signal as the cost function for training the 2×2 multiplication.

As illustrated by examples of training the first training signal may be straightforward. According to one aspect, a sequence of samples of the first training signal is input to the baseband I-Q mixer of the receiver, and a corresponding sequence of mixer intermediate output I signals and mixer intermediate output Q signals is input to the 2×2 matrix multiplication function (not separately numbered) of the decoupling unit 18. Next, iteratively, samples of the propagated mixer baseband in-phase signal $Z_i$ and propagated mixer baseband quadrature-phase signal $Z_q$ are input to the 2×2 multiplication function of the unit 18, and the resulting sequence outputs, namely of imbalance compensated Q signals is compared to a given threshold. This sequence is a least-mean square estimation. The estimation and iterative adjustment of the 2×2 multiplication unit may be on a sample-by-sample basis, or may use longer sequences of samples. Various alternatives for performing the estimation will be apparent.

Further to this one aspect of training based on a first training signal consisting only of an I-signal component, wherein the 2×2 complex multiplication unit comprises a first value and a second value, the second value is trained using a second training signal that, unlike the first training signal, consists only of a Q-signal component.

Upon completion of the training of the trainable mixer imbalance decoupling unit 18, its 2×2 multiplier or equivalent is trained, i.e., adapted, namely by training the P and S value to zero the off-diagonal elements of D, the D multiplier effectively decouples the coupling imbalances of the I-Q baseband mixer 12 for which it was trained, by having P and S values automatically adapted, in reference to the FIG. 2 model 20, to the non-zero values of that actual mixer's $f_{12}$ or $f_{21}$ elements.

Therefore, as can be understood, after the described training sets the P and S value to zero the off-diagonal elements of D, if an $\overline{Rin}(t)$ signal having only an I-component is input to the I-Q baseband mixer 12 then, after the mixing generates $V_i$ and $V_q$, these pass through 14I and 14Q, respectively, to become $Z_i$ and $Z_q$, and, after the G 2×2 multiplier or equivalent of the unit 18, only the mixer decoupled I signal, $S_i$, is non-zero. The mixer imbalance decoupled Q signal, $S_q$, is zero (or acceptably close to zero based on a given mixer balancing threshold). Likewise, if an $\overline{Rin}(t)$ signal having only a Q-component is input to the I-Q baseband mixer 12 then, after mixing to generates $V_i$ and $V_q$, passing through 14I and 14Q, respectively, to become $Z_i$ and $Z_q$, the G 2×2 multiplier or equivalent of the unit 18 results in only the mixer decoupled Q signal, $S_q$, being non-zero.

Figure 5:
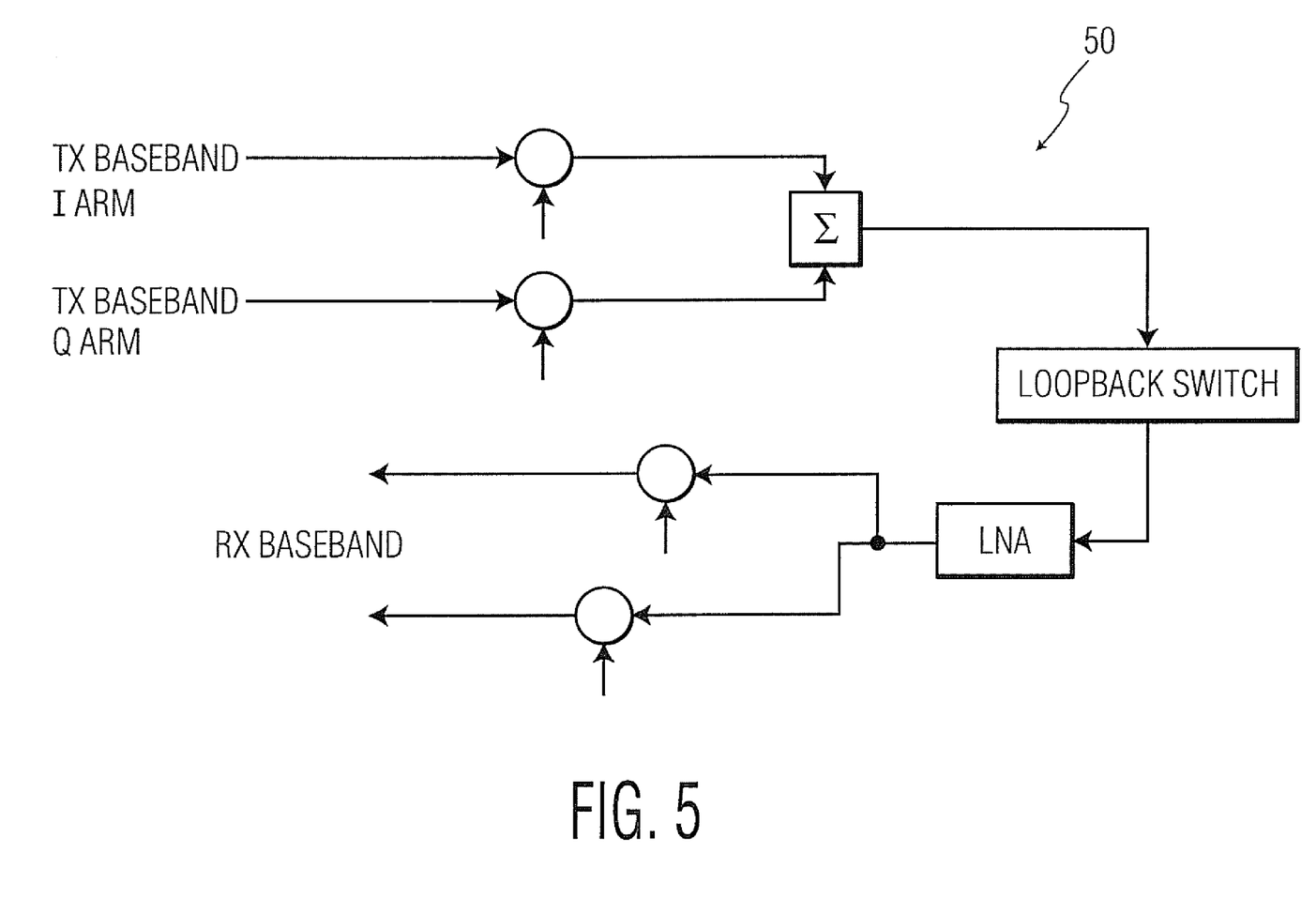
FIG. 5 shows a functional block diagram of one example arrangement for generating a training signal to train one or both of an I-Q mixer imbalance compensator and an I-arm-Q-arm imbalance compensator according to various embodiments.

FIG. 5 shows one example training the I-Q decoupling compensator 18 and the I-Q arm imbalance compensator 19.

Referring to FIG. 5, as shown a post mixer loopback is preferred, i.e., a loop from the transmitter mixer (not shown) output, or the power amplifier (not shown) output to the inputs of the I-Q baseband mixer 12. Referring to FIG. 1, external inputs or ports to the internal mixers (not shown) of the I-Q baseband mixer 12 are not separately shown. Referring to the FIG. 5 diagram, persons skilled in the art, however, can readily implement the depicted connections.

Various techniques for generating the training signals will be apparent to persons skilled in the relevant art based on reading this disclosure. One example technique, which is only for purposes of assisting in understanding of concepts by illustrative example, is:

a. generate a pseudorandom (PN) sequence using, for example, a 32-bit linear feedback shift register (LFSR), or equivalent, having its polynomial as, for example, $1+x^{13}+X^{33}$.

b. Map I arm or the Q arm or both the I and Q arms (using BPSK) using this PN sequence, as described in greater detail in later sections. This mapped time domain signal will form the in-phase and quadrature-phase signal for the I-path and Q-path respectively.

c. Compensate this baseband I-Q signal for transmitter IQ imbalance.

d. Transmit the transmitter IQ imbalance compensated time domain signal to, for example, a loopback as depicted at FIG. 5. or an equivalent set-up.

Persons of ordinary skill in the art, based on reading this disclosure in its entirety, can readily identify and implement receiver I-Q training waveform generation architectures.

Figure 6:
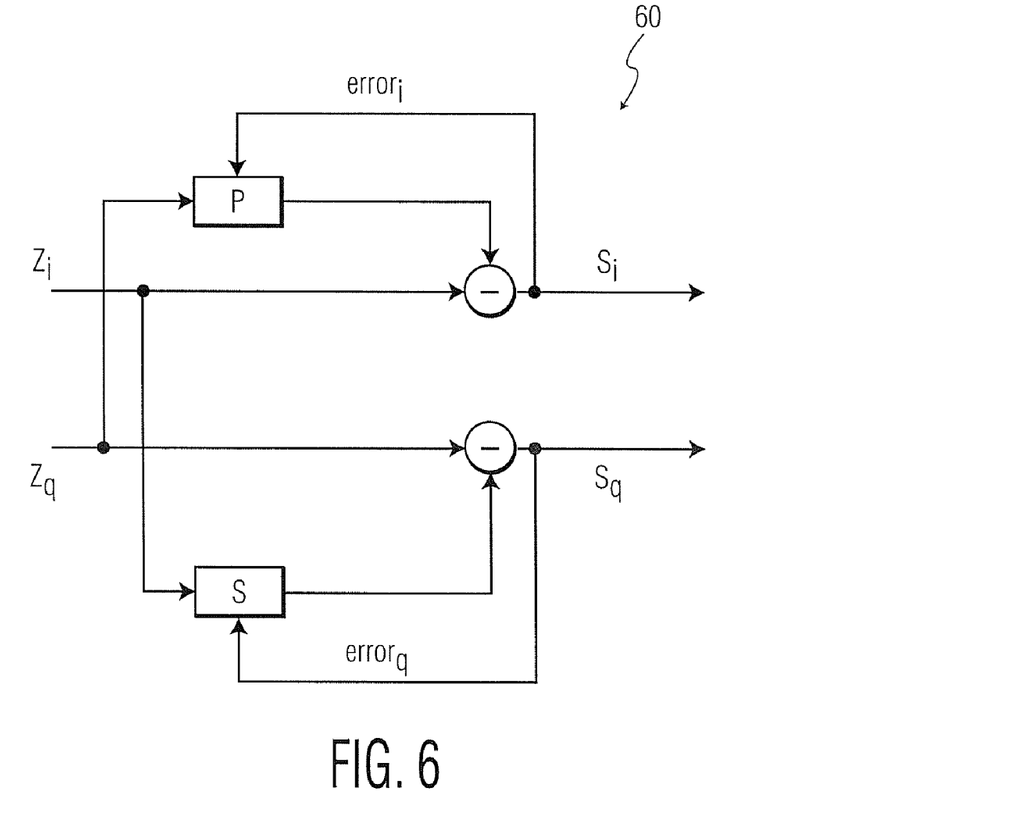
FIG. 6 shows one example of one adaptive, iterative training process to generate one example of parameter values of one example I-Q mixer imbalance compensator according to various embodiments.

FIG. 6 is a graphical diagram of one algorithmic flow for one iterative calibration method for obtaining P and S. The algorithm iteratively updates the estimated P and S using, according to one aspect, an error incrementally as a result of each iteration, to an acceptably accurate value of P and S.

Referring to FIG. 6, first, transmit a time domain random BPSK signal on the I-arm, with corresponding zero values on the Q-arm and, associated with the BPSK signal run an adaptive least-mean-square (LMS) algorithm to train the filter S, using $S_q$ as the error signal. $S_q$ may be considered as a cost function for performing the LMS. An LMS convergence target, arbitrarily labeled as CTI, may be provided and the value of S varied in a direction driving $S_q$ down until it meets a given criterion, such as meeting the CTI convergence target.

Second, transmit a time domain random BPSK signal on the Q-arm, with corresponding zero values on the I-arm and, associated with the BPSK signal run an adaptive least-mean-square (LMS) algorithm to train the filter S, using $S_i$ as the error signal. $S_i$ may be considered as a cost function for performing this LMS. An LMS convergence target, arbitrarily labeled as CTI, may be provided and the value of S varied in a direction driving $S_i$ down until it meets a given criterion, such as meeting the CTI convergence target.

Third, transmit a time domain random BPSK signal on both the I arm and the Q-arm with the constraint that the signal on I arm is equal to signal on Q arm, and, associated with the BPSK signal run an adaptive least-mean-square (LMS) algorithm to train the filter R, using $R_i$ as the error signal. $R_i$ may be considered as a cost function for performing this LMS. An LMS convergence target, arbitrarily labeled as CTI, may be provided and the value of S varied in a direction driving $S_i$ down until it meets a given criterion, such as meeting the CTI convergence target.

As will be understood by persons skilled in the art based on this disclosure, a constant phase offset between the transmit and receive paths does not affect the functioning of the estimation algorithms of P, S and R. This constant phase offset which results in an unbalanced coupling causes the values P, S and R to be modified in the estimation algorithms in such a way that a fixed constant offset appears in the IQ imbalance compensated receiver as described in this present invention. Persons skilled in the art generally know how to deal with such constant phase rotation or more generally any constant complex multiplication in a communication receiver which is introduced as seen in this example of the invention; hence any such method of managing such constant phase rotation is not described in this invention.

As can be readily understood, because of superposition, after training the trainable mixer imbalance decoupling unit 18 using, for example, the above-described iterative training with a first training signal and second training signal as Rin(t), composed of an I-signal component and a Q-signal component, respectively, the decoupling unit 18 effectively decouples mutual effects of the I-signal components and the Q signal components, arising from $f_{12}$ or $f_{21}$ or, typically, both being non-zero that would otherwise manifest from various imperfections of the I-Q baseband mixer.

It will be understood that an effective operation of an actual, real-world I-Q baseband mixer, such as the FIG. 1 item 12, combined with the described trainable mixer imbalance decoupling unit 18, or any of the various alternatives apparent to persons skilled in the art based on this disclosure, provides a functional equivalent of an ideal mixer. This is one among the various benefits provided by various example embodiments within the present invention.

One or more embodiments may include, for example, only the trainable mixer imbalance decoupling unit 18, arranged in any manner described by, or apparent from the present disclosure, to perform the disclosed functions of diagonalizing above-identified D matrix. As can be seen, this decouples the mutual effects, i.e., mutual distorting effects, of I-signal components and Q-signal components arising from real-world I-Q baseband mixers.

Referring to FIG. 6, one or both of P and S may be single tap finite-impulse response (FIR) filters. Alternatively, one or both of P and S may be multi-tap FIR filters. According to one aspect, the P and S values are readily obtained using an iterative calibration, and one illustrative example will be described in greater detail below in reference to FIGS. 5 and 6.

Example Adaptive I-arm-Q-arm Imbalance Compensator

Figure 7:
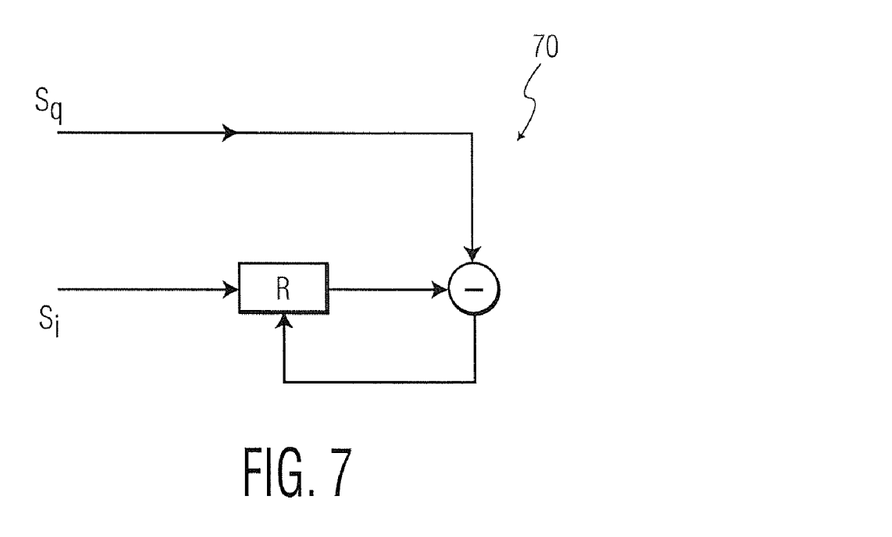
FIG. 7 shows one example of one adaptive, iterative training process to generate one example of parameter values of one example I-arm-Q-arm imbalance compensator according to various embodiments.

FIG. 7 is a graphical diagram of one algorithmic flow for one iterative calibration method, or training, for obtaining R for the FIGS. 1 and 4 I-Q imbalance compensator 19. It will be understood that the example described best adapts R only if there is zero, or sufficiently negligible cross-coupling such as, for example, cross-coupling due to mixer imbalance. Therefore, it will be understood that any mixer imbalance occurring after the generation of the described test signals is compensated, prior to the test signal being input to the described training of R, to remove any such cross-coupling. For example, such mixer imbalance may be compensated by using a mixer imbalance compensator system, such as the P and S systems and methods described above, after P and S are properly set, or trained by, for example, the process described in reference to FIG. 6.

Referring to FIG. 7, as can be seen the algorithm iteratively updates the estimated R using, according to this example, an error incrementally obtained as the difference between, referring to FIGS. 1 and 4, $R_i$ and $R_q$.

It will be understood that, in the example of FIGS. 1 and 4, the R filter is placed on the $S_i$ output of the I-Q mixer imbalance decoupling unit 18. In the depicted example, $R_q$ is therefore identical to $S_q$. This is only one example. R may, as one alternative, be arranged on the $S_q$ output of the unit 18.

With continuing reference to FIG. 7, in overview, if the input x=(xi, xq) =, for example, to (a, a), i.e., the same signal should be on both the I and Q branches. In other words, $R_i$ should be equal to $R_q$. If there are imbalances, resulting from, for example, $A_i$ being not equal to $A_q$, or $B_i$ being not equal to $B_q$, then, absent R, $S_i$ will not be equal to $S_q$. The objective of the FIG. 7 training of R is therefore to push R such that the difference between $R_i$ and $R_q$ is zero, or within a given threshold of zero.

Referring to FIG. 7, one example algorithm to iteratively generate R is:

a. Estimate the decoupling matrix G, as described above, to remove any mixer imbalance cross-coupling that, absent such compensation, would corrupt the training signal.

b. Transmit a random transmitter IQ imbalance compensated BPSK signal on both the I and the Q branches, i.e., the same signal.

c. Run an adaptive LMS algorithm, on a filter on one of the branches using the difference between $R_i$ and $R_q$ as the error for iteratively adapting the filter coefficients of the finite impulse response filter R.

Such an embodiment of the invention as described in the FIG. 7 can be used to estimate a compensator represented by the filter R or any such compensator which compensates for the independent I arm and Q arm imbalance which may or may not vary over a range of frequencies, hence called the frequency dependent IQ imbalance, by any person ordinarily trained in the art.

Another embodiment of this example when used in conjunction with the Example I as illustrated in FIG. 5, can be used by any person skilled in the art to compensate for both cross-coupling IQ imbalance as introduced by a real-world mixer which affects all frequencies in the same way, if seen in the frequency domain, thus called the frequency independent IQ imbalance and the frequency dependent IQ imbalance as shown in this example.

Figure 8:
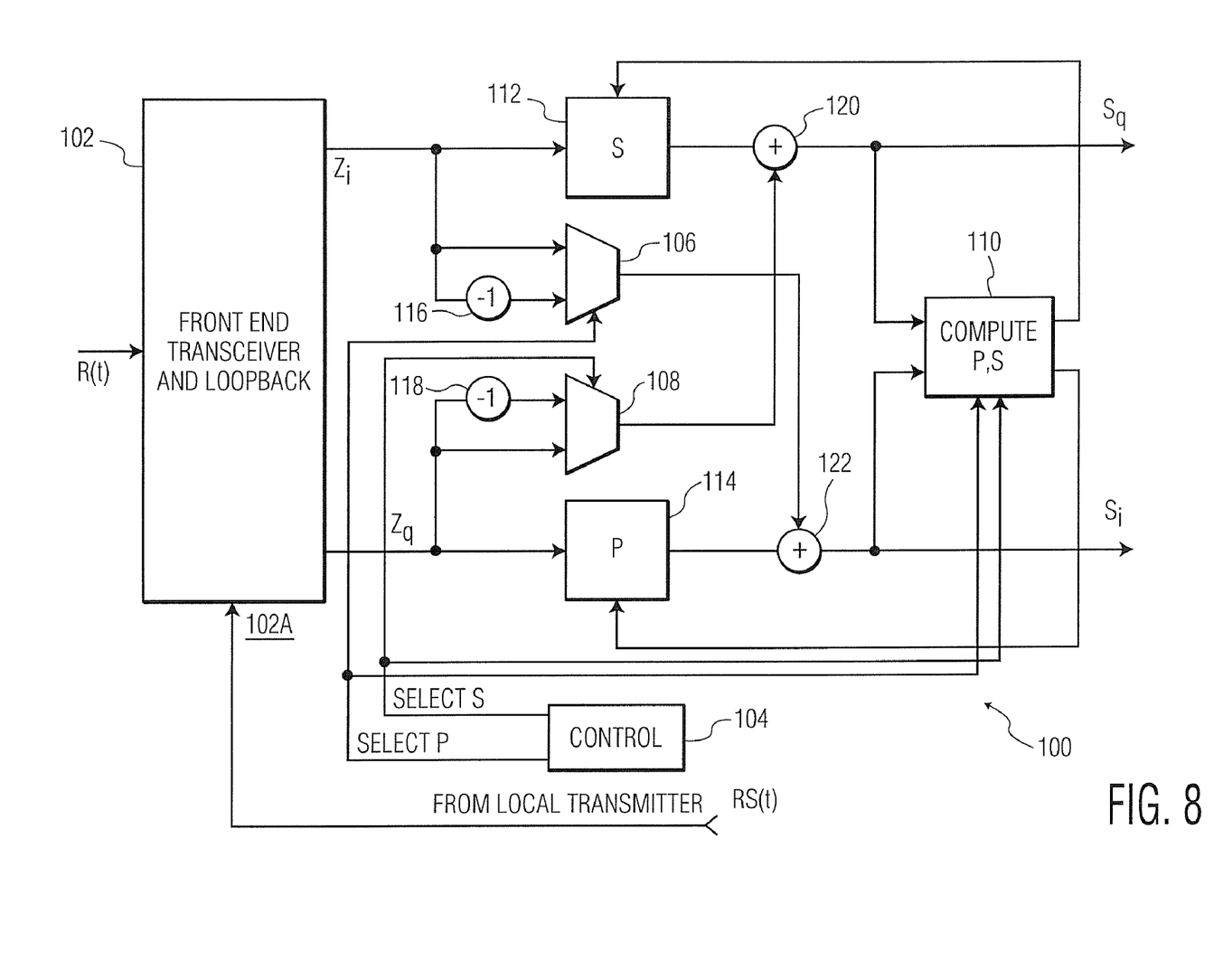
FIG. 8 shows one example of one integrated imbalance compensated I-Q transceiver system according to one embodiment, having one example adaptive I-Q mixer imbalance compensator, and having one example loopback based adaptive, iterative training feature.

For example, FIG. 8 shows one example of one integrated adaptive loopback imbalance compensated I-Q transceiver system 100 according to one embodiment. The example adaptive loopback compensated system 100 has one example adaptive I-Q mixer imbalance compensator, and having one example loopback based adaptive, iterative training feature.

Referring to FIG. 8, the depicted example loopback compensated system 100 includes a transceiver front end 102 capable of receiving an externally generated I-Q signal Rin(t) and a loopback signal RS(t) from a local transmitter (not shown at FIG. 8), having an I-mixer and a Q-mixer (not shown), and having a local carrier oscillator (not shown) for generating $\omega'_c$. The transceiver front end 102 may be, for example, a conventional off-the-shelf I-Q transceiver front end modified by adding a feedback loop switch, or by adding a second input for receiving a feedback RS(t) signal, and a multiplexer (not shown) for selectively inputting one of Rin(t) and RS(t) into the I-Q mixers. The local transmitter may be, for example, a conventional off-the-shelf I-Q transmitter. Persons of ordinary skill in the, applying the know-how persons possess to the present disclosure, can readily identify and construct implementations appropriate for particular applications. Further detail is therefore unnecessary and, accordingly, is omitted.

The example system further comprises a first mux 106, a second mux 108, a computational resource 110, an S compensation factor operator 112, a P compensation factor operator 114, an in-phase signal inverter 116, a quadrature-phase signal inverter 118, an quadrature-phase compensation summer 120, and an in-phase compensation summer 122.

It will be understood, as was previously described as being applicable to all functional blocks unless otherwise stated, that functional blocks such as the controller 104, muxes 106 and 108, computational resource 110, S and P operators 112 and 114, inverters 116 and 118, and the summing operators 120 and 122 represent functions, and do not necessarily represent hardware units or structure. Persons of ordinary skill in the, applying the know-how persons possess to the present disclosure, can readily identify and construct implementations of each of these functions that are appropriate for particular applications and, therefore, further detailed description is omitted.

Referring to FIG. 8, it will be apparent to persons of ordinary skill in the art that the transceiver front end 102 may be represented by a model equivalent to a cascade of the FIG. 2 model of a real-world mixer, and the FIG. 3 model of an I-path and a Q-path (also termed an I-arm and Q-arm). The outputs of the transceiver front end 102 are therefore labeled $Z_i$, $Z_q$, to correspond to the $Z_i$ and $Z_q$ labels shown at the FIG. 3 and FIG. 4 models.

With continuing reference to FIG. 8, the example loopback compensated system 100 is capable of two modes of operation—a training mode and an operating mode. The example loopback compensated system 100 is further capable of two sub-modes of the training mode. One of the sub-modes trains a first mixer imbalance compensation factor, which in the depicted example is the compensation operator S within the G matrix of Equation (5) as previously described, and the other of the sub-modes trains a second mixer imbalance compensation factor, which in this example is the compensation operator P within the G matrix of Equation (5). The S and P operations may be, but are not necessarily, FIR operations. A controller such as, for example, the controller represented by block 104, performs a function of switching between these modes by, for example, controlling a first mux 106, a second mux 108, and a computational resource 110.

Referring to FIG. 8, one example operation for training the S compensation factor will be described. As described in relation to the FIG. 6 example training of S and P factors, for the FIG. 8 example system 100 to properly train an S factor, the local transmitter must have a balanced I-Q mixer, with no cross-coupling between the I and Q information channels. First, the controller 104 causes the local transmitter to generate a signal RS(t) having only an in-phase component, and controls the front end 102 to not receive any external signal Rin(t), or to otherwise prevent non-trivial energy from any Rin(t) from reaching the internal I-Q mixers of the front end 102.

In response to the signal RS(t) having only an in-phase component, the transceiver front end 102 outputs a $Z_i$ and a $Z_q$ and as apparent to persons of ordinary skill in the art, assuming $\omega'_C$ is identical (or sufficiently close to) $\omega_C$, without any phase rotation at internal I-Q mixers of the front end 102, and the internal I-Q mixers and all relevant signal paths of the front end 102 were perfect, $Z_i$ would be the only non-zero valued signal. However, these conditions may not be extant and, therefore, both $Z_i$ and $Z_q$ will be non-zero.

With continuing reference to FIG. 8, in the S-training mode, the controller 104 controls the mux 108 to selected the $-Z_q$ signal from the inverter 118, and output $-Z_q$ to the quadrature-phase compensation summer 120. The other input to the quadrature-phase compensation summer 120 is the in-phase signal $Z_i$ after being operated on by the most recent iteration of the S operator. The output $S_q$ of the quadrature-phase compensation summer 120 is therefore output $SZ_i-Z_q$. As readily apparent, during the S training mode, the output $SZ_i-Z_q$ is the error because, since the training signal RS(t) has only an in-phase information component, an ideal $Z_q$ is zero and, therefore, the compensated output $S_q$ should be zero. The computational resource 110 therefore iterates the value, or filter characteristic of S until $SZ_i-Z_q$ equals zero, or is under a given acceptable minimum value.

With continuing reference to FIG. 8, an example operation in the P training mode will now be described. It will be understood that the order in which operations, or modes, of elements or functions are described does not necessarily indicate an order in which the functions or elements are placed into a described mode.

Referring to FIG. 8, to perform a P training, the controller 104 causes the local transmitter to generate a signal RS(t) having only a quadrature-phase component. As described above, the controller also controls the front end 102 to not receive any external signal Ri(t), or to otherwise prevent non-trivial energy from any Ri(t) from reaching the internal I-Q mixers of the front end 102.

In response to the signal RS(t) having only a quadrature-phase component, the transceiver front end 102 outputs a $Z_i$ and a $Z_q$ of which, if ideal conditions were met, only $Z_q$ would be non-zero. However, these conditions may not be extant and, therefore, both $Z_q$ and $Z_i$ will be non-zero.

With continuing reference to FIG. 8, in the P-training mode, the controller 104 controls the mux 106 to selected the $-Z_i$ signal from the inverter 116, and output $-Z_i$ to the in-phase compensation summer 122. The other input to the in-phase compensation summer 122 is the quadrature-phase signal $Z_q$ after being operated on by the most recent iteration of the P operator. The output $S_i$ of the in-phase compensation summer 122 is therefore $PZ_q-Z_i$. The output $PZ_q-Z_i$ is the error because, since the training signal RS(t) has only a quadrature-phase information component, an ideal $Z_i$ is zero. Therefore, the compensated output $S_i$ should be zero. The computational resource 110 therefore iterates the value, or filter characteristic of P until $PZ_q-Z_i$ equals zero, or is under a given acceptable minimum value.

Referring still to FIG. 8, an example operation in the normal operating mode will now be described. First, the controller 104 controls the front end 102, and disables any loopback switches (not shown) to input an external I-Q signal, Rin(t), to the front end 102 I-Q mixers. The front end 102 outputs, as a result of the mixing, including mixing imbalances and imbalances between the I-path and Q-path, a resulting $Z_i$ and $Z_q$ signal. The $Z_i$ and $Z_q$ signal will have the same mixer imbalance cross-coupling for which S and P were trained as described above. The controller 104 also controls the mux 106 to send the $Z_i$ output from the front end unit 102 to the in-phase compensation summer 122, and controls the mux 108 to send the $Z_q$ quadrature-phase output from the front end unit 102 to the compensation summer 120.

With continuing reference to FIG. 8, the non-inverting path from the $Z_i$ output of the front end 102 through mux 106 to the in-phase compensation summer 122, and the non-inverting path from the $Z_q$ output of the front end 102 through mux 108 to the quadrature compensation summer 120, are each shown as a unity gain path. This corresponds to the G matrix, defined at Equation (6), having "1" as diagonal elements. It will be understood that the value of "1" is only relative and, in fact, may be a scalar gain. However, "1" is used for clarity of description.

Referring still to FIG. 8, after the system 100 has been calibrated and is in a normal mode of operation as described above the $S_i$ output from the in-phase compensation summer 122 is $S_i=Z_i+PZ_q$, and the $S_q$ output from the quadrature-phase compensation summer 120 is $S_q=Z_q+SZ_i$. As is readily apparent, this implements the Equation (6) compensation for coupling between the in-phase $Z_i$ and quadrature phase $Z_q$ signals due to mixing imbalance FIG. 9 shows one example of one integrated imbalance compensated I-Q transceiver system 100' according to one embodiment, having one example adaptive I-arm-Q-arm imbalance compensator, comprising an R filter as described in reference to FIG. 7, and having one example loopback based adaptive, iterative training feature.

Figure 9:
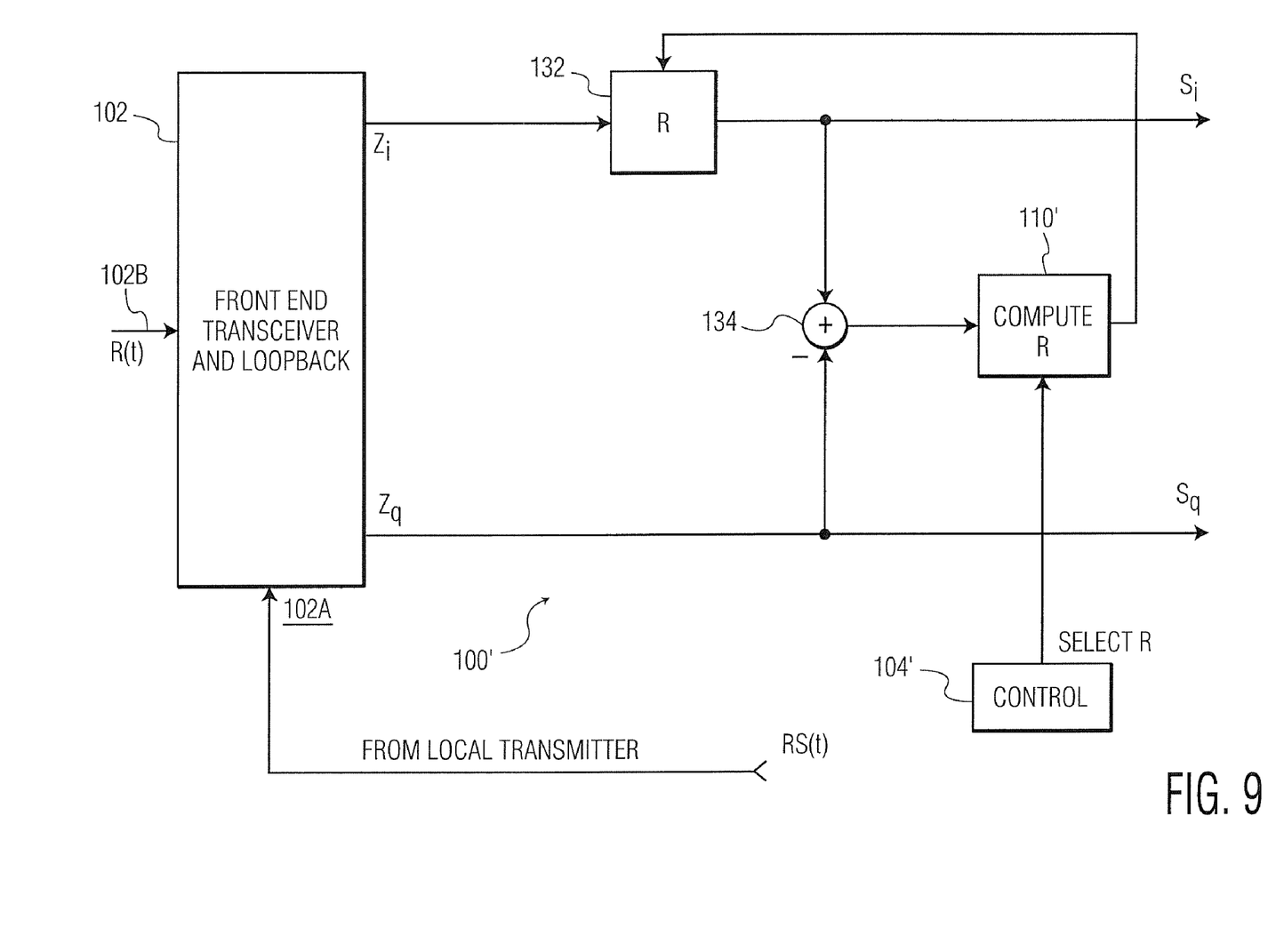
FIG. 9 shows one example of one integrated imbalance compensated I-Q transceiver system according to one embodiment, having one example adaptive I-arm-Q-arm imbalance compensator, and having one example loopback based adaptive, iterative training feature.

Referring to FIG. 9, the example system 100' does not include a G matrix compensator for mixer imbalances. The example system 100' includes only an R filter compensator for imbalances in delay between the I-path and Q-path, such as modeled by the B matrix at FIGS. 3 and 4. As previously described, in reference for example to FIG. 7, training of an R compensator is best done only if the mixer cross coupling imbalance has been compensated, or if a near-ideal mixer is used in the front end 102. The FIG. 9 example system is described assuming that one of these circumstances is extant.

Turning to FIG. 9, the example system 100' may use the same front end 102 that is described in reference to FIG. 8. The control 104' may be similar, in that it controls the front end 102, or loopback switches (not shown) to selectively loop back a signal from the local transmitter (not shown) of the transceiver 100' to the front end 102, and controls the local transmitter to generate the training signals RS(t) that are looped back. As described in reference to FIG. 7, the training signal RS(t) for training the R compensator must have identical in-phase and quadrature components. One illustrative example RS(t), which is described in reference to FIG. 7, is a pseudorandom sequence of two states, with I and Q equal at both.

Figure 10:
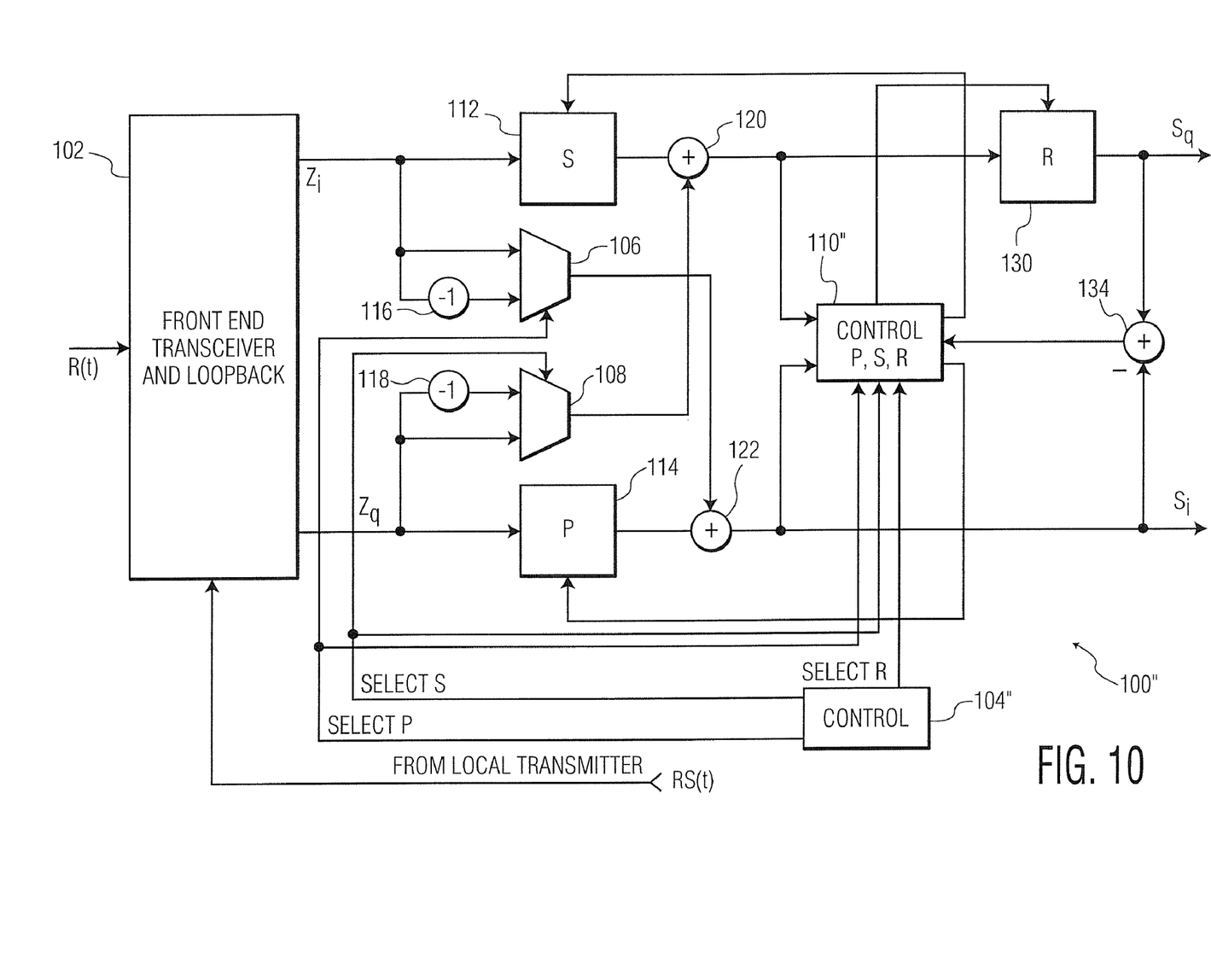
FIG. 10 shows one example of one integrated imbalance compensated I-Q transceiver system according to one embodiment, having one example adaptive I-Q mixer imbalance compensator, combined with one example adaptive I-arm-Q-arm imbalance compensator, and having one example loopback based adaptive, iterative training feature.

Referring still to FIG. 9, in an example training mode, the RS(t) sequence is generated by the local transmitter and input to the internal I-Q mixers of the transceiver 102 through, for example a separate loopback input 102A. The corresponding Zi ouput is input to the R operator 132, which may be an FIR filter, having the latest iteration of R. The computational resource 110' and/or the controller 104' may initialize R in 132 prior to the training operation. The output of 132, which is RZi, is fed to a non-inverting input of an error comparator 134, and the Zq output of the front end 102 is fed to the inverting input. It will be understood that "inverting" and "non-inverting" are only relative terms. The function of the error comparator 134 is to identify the difference between RZi and Zq. This difference, or cost function, is fed into the computational resource 110'. The computational resource 110', in response, update the value of R in the element 132, and process repeats. The process repeats until the error reaches a predetermined acceptable threshold. The controller 104' then may control the front end 102 of the adaptive transceiver to divert the loopback input at 102A from being fed to the internal I-Q mixers, or may control and external loopback switch, to prevent any loopback signal from reaching input 102A. FIG. 10 shows one example of one integrated imbalance compensated I-Q transceiver system 100" according to one embodiment, having one example adaptive I-Q mixer imbalance compensator, combined with one example adaptive I-arm-Q-arm imbalance compensator, and having one example loopback based adaptive, iterative training feature.

Referring to FIG. 10, the example system 100" may be a combination of the above-described example adaptive loopback I-Q mixer imbalance compensating transceiver 100, having the described S and P adaptive mixer imbalance compensation, and the adaptive loopback I-Q arm imbalance compensating transceiver 100", having the described R adaptive arm imbalance compensation. The controller is labeled 104", and the computational resource is labeled 110" to identify the combined functionality.

While certain embodiments and features of the invention have been illustrated and described herein, many modifications, substitutions, changes, and equivalents will occur to those of ordinary skill in the art, and the appended claims cover all such modifications and changes as fall within the spirit of the invention.

We hereby claim:

1. A method of compensating an in-phase/quadrature (I-Q) transceiver having an I-Q receiver and a local transmitter, comprising:

generating an adaptively trained cross-coupling imbalance compensator operator, said generating comprising:

generating a first training signal from the local transmitter, the first training signal having a given I-phase information component and a zero Q-phase information component, looping the first training signal back to the I-Q receiver to generate a baseband first training I-phase signal and a baseband first training Q-phase signal, generating an error signal, said generating the error signal including generating a product of a given cross-coupling imbalance first compensating factor and the baseband first training I-phase signal and subtracting the baseband first training Q-phase signal from said product to generate said error signal, updating said cross-coupling imbalance first compensating factor based on said error signal, and repeating said looping the first training signal, said generating an error signal and said updating said cross-coupling imbalance first compensating factor until said error signal meets a given criterion;

generating a second training signal from the local transmitter, the second training signal having a given Q-phase information component and a zero I-phase information component, looping the second training signal back to the I-Q receiver to generate a baseband second training I-phase signal and a baseband second training Q-phase signal, generating a second error signal, said generating the second error signal including generating a product of a given cross-coupling imbalance second compensating factor and the baseband second training Q-phase signal and subtracting the baseband second training I-phase signal from said product to generate said second error signal, updating said cross-coupling imbalance second compensating factor based on said second error signal, repeating said looping the second training signal, said generating a second error signal and said updating said cross-coupling imbalance second compensating factor until said second error meets a given criterion, and forming said adaptively trained cross-coupling imbalance compensator operator based on said updated cross-coupling imbalance first compensating factor and said updated cross-coupling imbalance second compensating factor;

inputting an externally generated I-Q signal to the I-Q receiver to generate a corresponding in-phase baseband signal and a corresponding quadrature-phase baseband signal;

generating a cross-coupling imbalance compensated in-phase baseband signal and a cross-coupling imbalance compensated quadrature-phase baseband signal based on said adaptively trained cross-coupling imbalance compensator operator by:

receiving an in-phase baseband signal and a quadrature-phase baseband signal, generating a cross-coupling decoupled compensated in-phase baseband signal by forming an arithmetic product of the quadrature-phase baseband signal and said cross-coupling imbalance second compensating factor and adding said arithmetic product to said in-phase baseband signal to generate said cross-coupling imbalance decoupled compensated in-phase baseband signal, and generating a cross-coupling decoupled quadrature-phase baseband signal by forming an arithmetic product of the in-phase baseband signal and said cross-coupling imbalance first compensating factor and adding said arithmetic product to said quadrature-phase baseband signal to generate said cross-coupling imbalance decoupled compensated quadrature-phase baseband signal.

2. The method of claim 1, further comprising generating an adaptively trained I-Q arm imbalance compensator operator, said generating comprising:

generating a third training signal from the local transmitter, the third training signal having a given I-phase information component and a Q-phase information component identical to said given I-phase information component, looping the third training signal back to the I-Q receiver to generate a baseband third training I-phase signal and a baseband third training Q-phase signal, generating a cross-coupling imbalance compensated in-phase baseband third training signal and a cross-coupling imbalance compensated quadrature-phase baseband third training signal based on said adaptively trained cross-coupling imbalance compensator operator, generating one of an I-Q arm imbalance compensated in-phase baseband third training signal and an I-Q arm imbalance compensated quadrature-phase baseband third training signal, based on a given I-Q arm imbalance compensating operator operating on a corresponding one of said cross-coupling imbalance compensated in-phase baseband third training signal and said cross-coupling imbalance compensated quadrature-phase baseband third training signal, generating a third error signal based on subtracting said generated one of said I-Q arm imbalance compensated in-phase baseband signal and said I-Q arm imbalance compensated quadrature-phase baseband signal from a corresponding one of said cross-coupling imbalance compensated in-phase baseband third training signal and said cross-coupling imbalance compensated quadrature-phase baseband third training signal, updating said given I-Q arm imbalance compensating operator based on said error signal, and repeating said looping the first training signal, said generating a third error signal and said updating said I-Q arm imbalance compensating operator until said error meets a given criterion; and generating a cross-coupling imbalance compensated in-phase baseband third training signal and a cross-coupling imbalance compensated quadrature-phase third training baseband signal, based on said third training signal and said adaptively trained cross-coupling imbalance compensator operator, generating an I-Q arm imbalance compensated in-phase baseband signal based on a given I-Q arm imbalance compensating operator operating on said cross-coupling imbalance compensated quadrature-phase baseband third training signal, generating an error signal, said generating based on subtracting said I-Q arm imbalance compensated quadrature-phase baseband signal from said cross-coupling imbalance compensated in-phase third training baseband signal, updating said given I-Q arm imbalance compensating operator based on said error signal, and repeating said looping the third training signal, said generating an error signal and said updating said I-Q arm imbalance compensating operator until said error meets a given criterion.

3. The method of claim 2, further comprising:

generating an I-Q arm imbalance compensated in-phase baseband signal and an I-Q arm imbalance compensated quadrature-phase baseband signal based on said cross-coupling imbalance compensated in-phase baseband signal and said cross-coupling imbalance compensated quadrature-phase baseband signal, based on updated I-Q arm imbalance compensating operator operating on said cross-coupling imbalance compensated quadrature-phase baseband signal.

4. The method of claim 2, wherein I-Q arm imbalance compensating operator is a finite impulse response (FIR) filter having coefficients R.

5. The method of claim 1, wherein said cross-coupling imbalance second compensating factor is a finite impulse response (FIR) filter having coefficients P.

6. The method of claim 1, wherein said cross-coupling imbalance first compensating factor is a finite impulse response (FIR) filter having coefficients S.

7. A method of compensating an in-phase/quadrature (I-Q) transceiver having an I-Q receiver and a local transmitter, comprising:

generating an adaptively trained I-Q arm imbalance compensator operator, said generating comprising:

generating a first training signal from the local transmitter, the first training signal having a given I-phase information component and a Q-phase information component identical to said given I-phase information component, looping the first training signal back to the I-Q receiver to generate a baseband first training I-phase signal and a baseband first training Q-phase signal, generating one of an I-Q arm imbalance compensated in-phase baseband signal and an I-Q arm imbalance compensated quadrature-phase baseband signal, based on a given I-Q arm imbalance compensating operator operating on a corresponding one of said baseband first training I-phase signal and said baseband first training Q-phase signal, generating an error signal based on subtracting said one of said I-Q arm imbalance compensated I-phase baseband signal from a corresponding one of said baseband first training I-phase signal and said baseband first training Q-phase signal, updating said given I-Q arm imbalance compensating operator based on said error signal, and repeating said looping the first training signal, said generating an error signal and said updating said I-Q arm imbalance compensating operator until said error meets a given criterion; and generating an I-Q arm imbalance compensated baseband signal by:

receiving an I-Q signal at said I-Q receiver to generate a baseband I-phase signal and a baseband Q-phase signal, and operating on one of said baseband I-phase signal and said baseband Q-phase signal with said updated I-Q arm imbalance compensating operator.

8. The method of claim 7, wherein said I-Q arm imbalance compensating operator is a finite impulse response (FIR) filter having coefficients R .

9. A loopback adaptively compensated in-phase/quadrature (I-Q) transceiver comprising:

an I-Q receiver having to receive an I-Q signal and generate a baseband I signal and a baseband Q signal;

a transmitter for generating an I-Q signal, said transmitter capable of generating a first training signal having an in-phase information component and a zero-valued quadrature information component, and capable of generating a second training signal having an quadrature-phase information component and a zero-valued in-phase information component;

a loopback controller for selectively looping the output of the transmitter to the I-Q receiver;

an adaptive cross-coupling imbalance compensator operator unit, having:

an error generator to generate a product of a given cross-coupling imbalance first compensating factor and an I-phase baseband signal from said I-Q receiver, and to subtract the baseband Q-phase signal from said product to generate said error signal, an updating unit to update said cross-coupling imbalance first compensating factor based on said error signal, and a controller to repeat a looping of the first training signal and said updating of said cross-coupling imbalance first compensating factor until said error meets a given criterion, wherein the error generator is capable of generating a product of a given cross-coupling imbalance second compensating factor and Q-phase baseband signal from said I-Q receiver, and subtracting the baseband I-phase signal from said product to generate a second error signal, wherein the updating unit is capable of updating said cross-coupling imbalance second compensating factor based on said second error signal, and wherein the controller is capable of repeating a looping of the second training signal and updating said cross-coupling imbalance second compensating factor until said error meets a given criterion; and a cross-coupling imbalance compensator to generate a compensated in-phase baseband signal and a cross-coupling imbalance compensated quadrature-phase baseband signal based on said cross-coupling imbalance first compensating factor and said cross-coupling imbalance second compensating factor.

10. The loopback adaptively compensated I-Q transceiver of claim 9, wherein the transmitter generates a third training signal having an in-phase information component and an identically valued quadrature information component.

11. The loopback adaptively compensated I-Q transceiver of claim 9, further comprising:

an I-Q arm imbalance compensator for receiving one of said cross-coupling imbalance compensated in-phase baseband signal and said cross-coupling imbalance compensated quadrature-phase baseband signal and generating a corresponding one of an I-Q arm imbalance compensated baseband I-signal and an I-Q arm imbalance compensated baseband Q-phase signal, wherein said I-Q arm imbalance compensator includes a training unit, said training unit having:

an error generator for generating an error signal based on subtracting one of said I-Q arm imbalance compensated baseband I-signal and said I-Q arm imbalance compensated baseband Q-phase signal from a corresponding one of said cross-coupling imbalance compensated in-phase baseband signal and said cross-coupling imbalance compensated quadrature-phase baseband signal, and a controller to update said I-Q arm imbalance compensator based on said error signal and to repeat a looping of the looping output of the transmitter to the I-Q receiver and to update said I-Q arm imbalance compensator until said error signal meets a given criterion.

\* \* \* \* \*